United States Patent [19]

Arold

[11] Patent Number: 5,169,356
[45] Date of Patent: Dec. 8, 1992

[54] PASSENGER COMPARTMENT AIR FILTER

[75] Inventor: Klaus Arold, Sindelfingen, Fed. Rep. of Germany

[73] Assignee: Mercedes-Benz AG, Fed. Rep. of Germany

[21] Appl. No.: 731,982

[22] Filed: Jul. 18, 1991

[30] Foreign Application Priority Data

Aug. 25, 1990 [DE] Fed. Rep. of Germany ....... 4026926

[51] Int. Cl.⁵ .............................................. B60H 3/06
[52] U.S. Cl. ..................................... 454/139; 55/502
[58] Field of Search .................. 55/355, 502; 454/139, 454/140, 156, 158

[56] References Cited

U.S. PATENT DOCUMENTS

| | | | |
|---|---|---|---|
| Re. 27,701 | 7/1973 | Allan, Jr. et al. | 55/502 X |
| 2,185,486 | 1/1940 | Wahlberg | 454/139 |
| 2,237,477 | 4/1941 | Colvin | 454/139 |
| 2,605,687 | 8/1952 | Scott | 454/140 |
| 2,731,104 | 1/1956 | Baker et al. | 454/158 X |
| 3,570,222 | 3/1971 | Dudek et al. | 55/502 X |
| 4,217,121 | 8/1980 | Fichter | 55/502 X |

FOREIGN PATENT DOCUMENTS

| | | |
|---|---|---|
| 8808009 | 9/1988 | Fed. Rep. of Germany . |
| 3822155 | 1/1989 | Fed. Rep. of Germany . |
| 3813548 | 11/1989 | Fed. Rep. of Germany . |
| 3824362 | 1/1990 | Fed. Rep. of Germany . |

Primary Examiner—Harold Joyce
Attorney, Agent, or Firm—Evenson, Wands, Edwards, Lenahan & McKeown

[57] ABSTRACT

A passenger compartment air filter arrangement for motor vehicles having a ventilation or air-conditioning system is provided with a filter for the air sucked in out of the passenger compartment of a motor vehicle. The filter is installed directly behind the cover of an intake channel. On the inlet side of the channel, the housing has a web-like flange which presses in a sealing manner into damping material of the foot space cover when the cover with the filter and a foot space cover are mounted, to achieve a good suction effect and noise damping.

2 Claims, 2 Drawing Sheets

PASSENGER COMPARTMENT AIR FILTER

BACKGROUND AND SUMMARY OF THE INVENTION

The present invention relates to a passenger car air filter arrangement in a motor vehicle that has a ventilation system or air conditioning system. The ventilation system or air conditioning system is connected via a channel formed in a housing to an intake opening of the channel. This intake opening is completely covered by a filter arranged in the air stream.

A passenger compartment air filter of this kind in which a filter, which completely covers the intake opening, is arranged at the end of the air inlet connection piece of the housing is shown in German Patent Document 38 24 362. The filter is designed as a microfilter and attached directly to the end of the air inlet connection piece. It is also possible if required to mount a channel-like intermediate piece which compensates cross-section differences between the air inlet opening on the housing and the connection cross-section of the filter. Since the complete air-conditioning system, which includes a blower, a vaporizer of the cold circulation, a heat exchanger arranged behind it in the direction of air flow for the vehicle heating, as well as the necessary inlet and outlet channels with associated adjustment flaps and flap controls, is contained in the housing, the complete unit has to be mounted in this form in the assembly space of a motor vehicle. Thus, in order to route further channels or the like to the passenger compartment of the vehicle, lines are necessary which have to be connected in the passenger compartment, via exit openings, to wall parts or the like present there. This is not only complicated but leads frequently to undesired noise production or noise transmission. Sealing problems also result with the seal so that any secondary connections in the air intake are prevented.

An object of the present invention is to provide a passenger compartment air filter which has a simpler design and can be integrated into the motor vehicle while reducing the danger of noise production or noise transmission, and which has a simplified sealing.

This and other objects are achieved by the present invention which provides a passenger compartment air filter arrangement in a motor vehicle having at least one of a ventilation and air conditioning system. The arrangement includes a housing having a channel with an intake opening, this channel connecting the ventilation or air conditioning system with the intake opening. A foot space cover is located in the passenger compartment, the housing being arranged above the foot space cover located in the passenger compartment and including a cover on a side of the passenger compartment, with the intake opening being provided at the foot space cover. A filter completely covers the intake opening of the channel, the filter being arranged directly behind the cover as a quasi-integral component of the cover. A sealing device is provided that includes a circumferential flange arranged on the housing and a seal on the foot space cover, this seal being penetrated by the circumferential flange. The sealing device is arranged between the intake opening and at least one of the foot space cover and the cover.

In certain embodiments of the invention, the circumferential flange is arranged on the cover and the seal is on the housing.

In an advantageous manner, the production of noise in the air intake channel and the transmission of solid-borne sound to the cover is avoided by the arrangement of the filter directly behind the cover as a quasi-integral component of the same and in the region of the foot space cover, as a result of which reduction of noise in the passenger compartment occurs. In addition, in a simple manner, the formation of the channel leading to the passenger compartment is possible by means of a housing which reaches thereto, as a result of which the intake effect of the blower of the ventilation or air-conditioning system can be improved. It is also advantageous that a reliable seal is realized in a simple manner in the region between the housing and the foot space cover or the cover with filter, and the occurrence of secondary connections during the extraction out of the passenger compartment is prevented. Furthermore, by means of the invention the air ducting in the air-circulation mode is simplified overall.

Other objects, advantages and novel features of the present invention will become apparent from the following detailed description of the invention when considered in conjunction with the accompanying drawings.

DETAILED DESCRIPTION OF THE DRAWINGS

Figure 1:
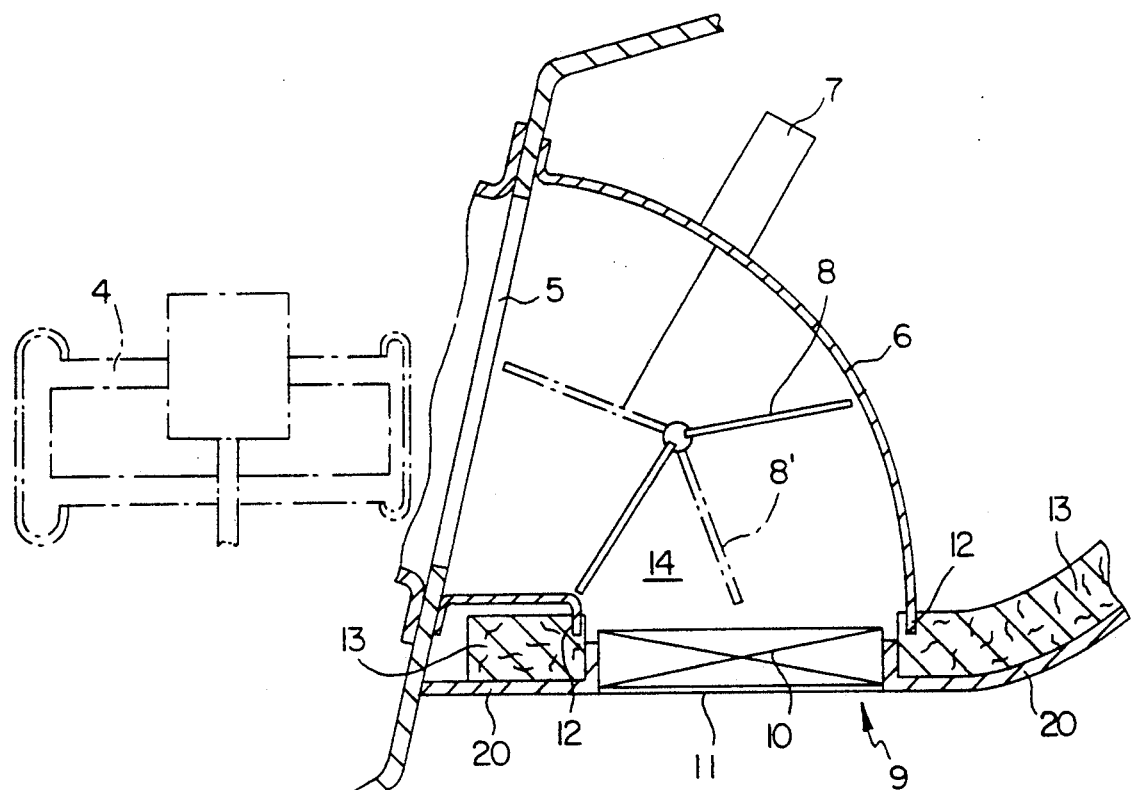
FIG. 1 shows a diagrammatic sectional view of a part of the passenger compartment of a motor vehicle with the passenger compartment air filter constructed according to an embodiment of the present invention.
Figure 2:
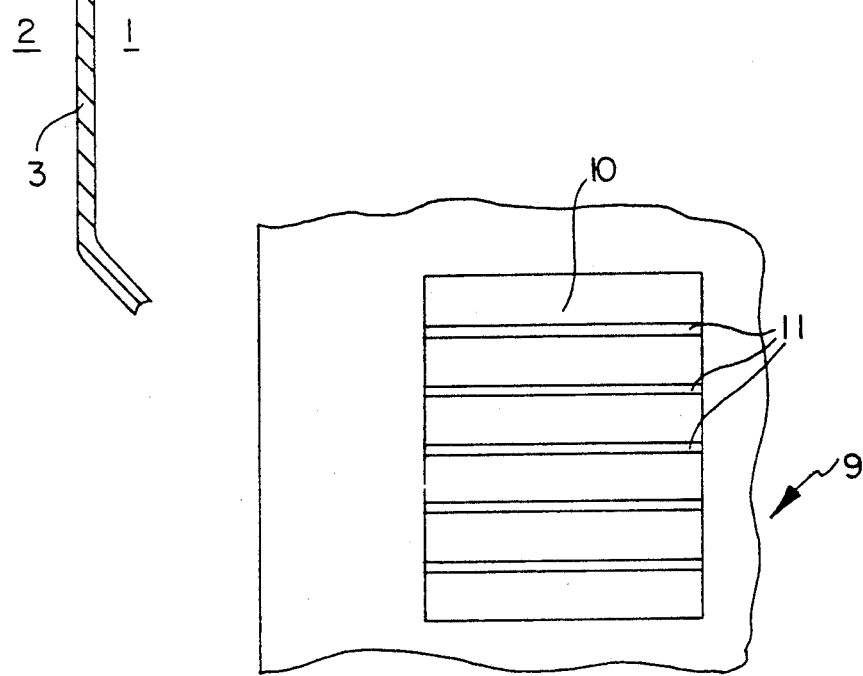
FIG. 2 shows a diagrammatic bottom view of the intake area in the embodiment of FIG. 1.

FIG. 1 shows a diagrammatic vertical section and a side view of a part of the passenger compartment I of a motor vehicle in the region below the instrument panel of which only the foot space cover 20 is shown. The passenger compartment 1 is divided by means of a dividing wall 3 from the engine space or assembly space 2. In the assembly space 2, an indicated blower 4 is arranged as a component of a heating or air-conditioning system (not illustrated) which can suck in air out of the passenger compartment 1 via an opening 5 in the dividing wall 3. A housing 6 is arranged on the inside of the opening 5. A flap 8 which can be controlled by means of a motor 7 is provided inside the housing 6. In the illustration shown by unbroken lines, the flap 8 closes the path between the blower 4 and the passenger compartment 1, and in the position 8' illustrated by broken lines the flap 8 opens this path.

On the side of the passenger compartment 1, the housing 6 is provided with a cover 9 which includes a filter 10 as a quasi-integral component. Webs 11 of the cover 9 can be located directly in front of the material of the filter 10 on the inflow side. If the material of the filter 10 rests directly against the webs 11, the solid-borne transmission of sound can thus be avoided, or at least greatly reduced.

The housing 6 ends in a circumferential flange 12 in the region of the cover 9. This flange 12 penetrates in a sealing manner damping material 13 which is arranged on the inside of the foot space cover 20, when the foot space cover 20 is mounted.

The opening, which is filled by the cover 9, of the channel 14 is covered completely by the filter 10, the material of the filter 10 resting directly against the webs 11 of the cover 9.

By virtue of the fact that the filter 10 is provided directly behind the cover 9 as a quasi-integral component of the cover 9, the formation of the channel 14 by the housing 6 to the blower 4 is possible in a simple manner. This improves the suction effect of the blower 4. Moreover, the transmission of solid-borne sound is avoided and an overall considerable reduction in noise is achieved.

Figure 3:
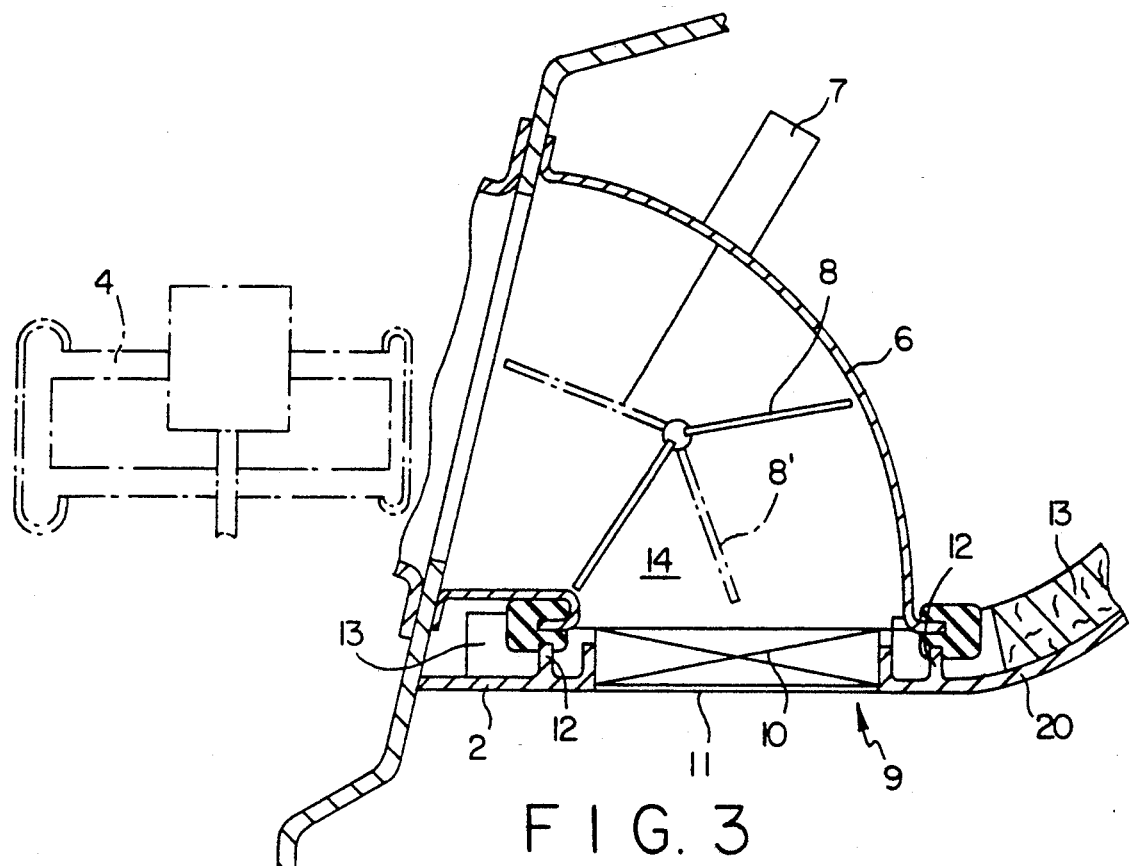
FIG. 3 shows a diagrammatic sectional view of another embodiment of the present invention.

By the illustrated manner of sealing, in which the web-like flange 12 penetrates the damping material 13 of the foot space cover 20, a particularly simple design of the seal is obtained. The sealing can also be provided in an opposite manner, namely with a circumferential web on the cover 9 and a seal on the input of the housing 6. This is illustrated in the embodiment of FIG. 3. Thus, an overall simple construction for the design of the passenger compartment air filter is obtained which permits simple air ducting in the air-circulation mode.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A foot space cover arrangement in a motor vehicle, comprising:
   a foot space cover;
   a filter cover in said foot space cover, the filter cover providing an air inlet through which air is guided to at least one of a ventilating and air-conditioning unit;
   a filter which rests on the filter cover as a quasi-integral component of the filter cover;
   a channel connecting the air inlet to the at least one of the ventilating and air-conditioning system;
   a damping material on a channel side of said foot space cover, said damping material forming a border around said filter cover; and
   a surrounding flange projecting from the channel and sealingly pressing into the damping material when the foot space cover is assembled over the channel.

2. The foot space cover arrangement of claim 1, wherein the surrounding flange is web-shaped.

* * * * *